(12) United States Patent
Williams et al.

(10) Patent No.: US 8,944,879 B1
(45) Date of Patent: Feb. 3, 2015

(54) GAME CALL DEVICE AND METHOD

(76) Inventors: Keith Williams, El Dorado, AR (US);
Tad Hobbs, El Dorado, AR (US)

( * ) Notice: Subject to any disclaimer, the term of this patent is extended or adjusted under 35 U.S.C. 154(b) by 134 days.

(21) Appl. No.: 13/454,810

(22) Filed: Apr. 24, 2012

(51) Int. Cl.
*A63H 5/00* (2006.01)

(52) U.S. Cl.
USPC ............................................. 446/397

(58) Field of Classification Search
USPC ................................................. 446/397
See application file for complete search history.

(56) References Cited

U.S. PATENT DOCUMENTS

| | | | | |
|---|---|---|---|---|
| 4,041,639 A | * | 8/1977 | Funk | 446/397 |
| 4,586,912 A | * | 5/1986 | Adams | 446/397 |
| 4,606,733 A | * | 8/1986 | Willis | 446/397 |
| 4,648,852 A | * | 3/1987 | Wingate | 446/397 |
| 4,854,914 A | * | 8/1989 | White, Jr. | 446/402 |
| 4,904,221 A | * | 2/1990 | Taylor | 446/397 |
| 4,988,325 A | | 1/1991 | Alderson et al. | |
| 5,529,526 A | * | 6/1996 | Wesley | 446/397 |
| 5,716,254 A | * | 2/1998 | Bowes | 446/397 |
| 5,846,119 A | * | 12/1998 | Long | 446/397 |
| 5,961,367 A | * | 10/1999 | Morris | 446/397 |
| 6,071,172 A | * | 6/2000 | Pate | 446/397 |
| 6,095,888 A | * | 8/2000 | Panepinto | 446/397 |
| 6,159,068 A | | 12/2000 | Trotter | |
| 6,210,252 B1 | | 4/2001 | Anderson | |
| 6,599,168 B1 | * | 7/2003 | Weaver | 446/397 |
| 6,669,529 B1 | * | 12/2003 | Scaries | 446/397 |
| 6,872,118 B1 | * | 3/2005 | Bishop | 446/397 |
| 6,929,528 B2 | * | 8/2005 | Collier | 446/418 |
| 7,169,009 B2 | * | 1/2007 | Marsh | 446/397 |
| 7,462,091 B1 | * | 12/2008 | Bean | 446/208 |
| 7,785,169 B2 | | 8/2010 | Moss | |
| 2010/0151769 A1 | | 6/2010 | Coffield | |
| 2010/0216371 A1 | | 8/2010 | Cubbedge | |
| 2012/0045963 A1 | | 2/2012 | Moss | |

OTHER PUBLICATIONS http://en.wikipedia.org/wiki/Petrified_wood.*
http://en.wikipedia.org/wiki/Slate.*

* cited by examiner

*Primary Examiner* — Kurt Fernstrom
*Assistant Examiner* — Dolores Collins
(74) *Attorney, Agent, or Firm* — R. Keith Harrison

(57) ABSTRACT

A game call device includes a game caller having a game caller box with a sound chamber, a petrified wood strike plate carried by the game caller box and a striker adapted for scraping against the strike plate of the game caller to produce simulated game sounds.

14 Claims, 3 Drawing Sheets

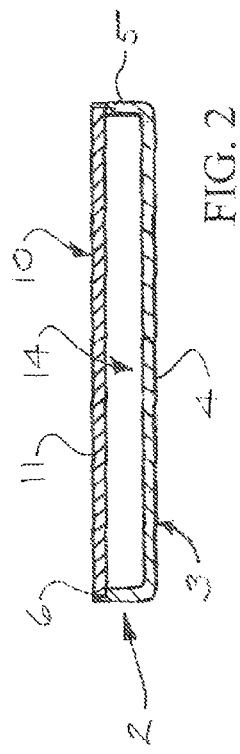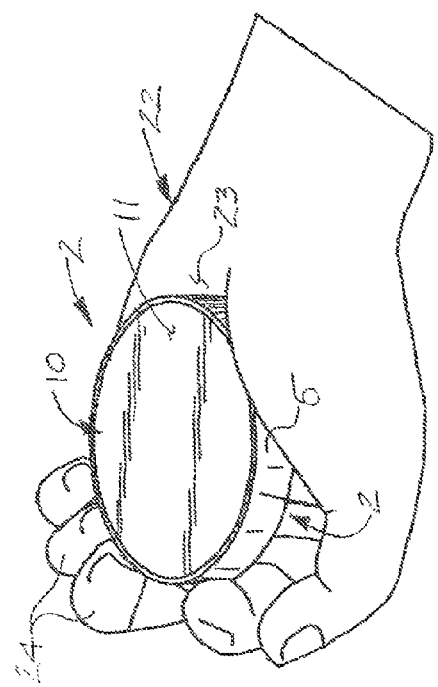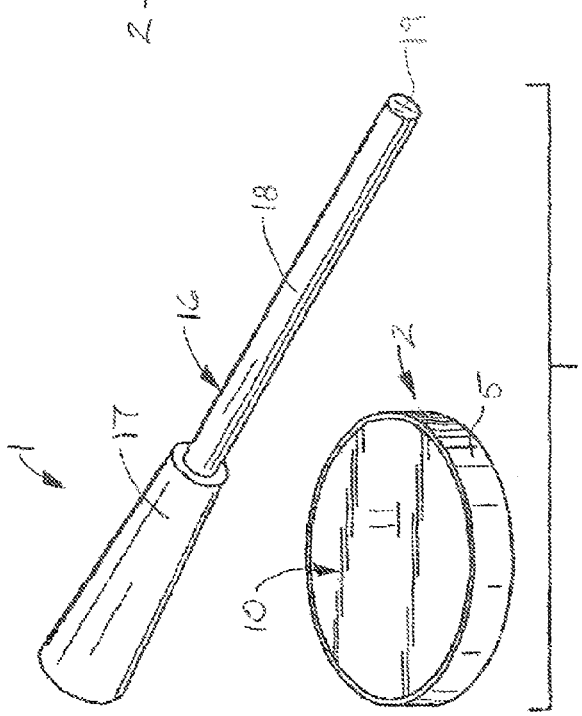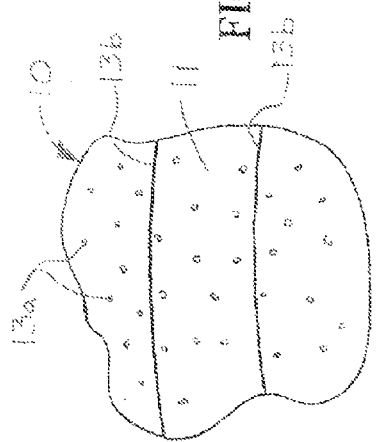

GAME CALL DEVICE AND METHOD

FIELD

Illustrative embodiments of the disclosure generally relate to game call devices for attracting wild game such as turkeys. More particularly, illustrative embodiments of the disclosure relate to a game call device having a strike plate of petrified wood and a game call method using a game call device having a strike plate of petrified wood.

BACKGROUND

Game call devices are widely used to attract turkeys or other game for hunting, observation or other purposes. A conventional game call device which is commonly used to attract turkeys includes a hand-held game caller having a strike plate which is made of stone, ceramic, Formica or metal and has a flat strike plate surface. A striker which typically includes an elongated wooden shaft is repeatedly scraped against the strike plate surface to produce vibration sounds which simulate a mating call or other sounds made by a wild turkey and therefore attract turkeys to the area. The quality and types of sounds which are produced by scraping the striker against the strike plate surface depend on both the material composition of the strike plate and the striker and the experience and skill of the user.

Conventional game call devices having a stone, ceramic, Formica or metal strike plate have several drawbacks. Beginners or unskilled persons frequently have difficulty mastering the proper technique required to correctly scrape the striker against the strike plate surface in order to authentically simulate mating and other sounds made by a turkey. Moreover, there is typically little or no variation in the sound which can be produced by scraping the striker against different areas or regions of the strike plate surface since substantially the same sound is produced at all areas or regions on the surface. Thus, the variety of simulated turkey sounds which can be produced using game call devices having a strike plate made of these conventional materials is limited.

It has surprisingly been found that use of a strike plate made of petrified wood provides a game call device use of which is easily mastered by beginners and which generates a variety of simulated turkey sounds depending on the area of the strike plate surface against which the striker is scraped.

Accordingly, a game call device having a strike plate of petrified wood and a game call method using a game call device having a strike plate of petrified wood are needed.

SUMMARY

The disclosure is generally directed to a game call device. An illustrative embodiment of the game call device includes a game caller having a game caller box with a sound chamber, a petrified wood strike plate carried by the game caller box and a striker adapted for scraping against the strike plate of the game caller to produce simulated game sounds.

The disclosure is further generally directed to a game call method. An illustrative embodiment of the game call method includes providing a game call device having a game caller with a petrified wood strike plate and a striker, applying the striker against the strike plate and moving the striker with respect to the strike plate.

BRIEF DESCRIPTION OF THE DRAWINGS

Illustrative embodiments of the disclosure will now be described, by way of example, with reference to the accompanying drawings, in which:

FIG. 1 is a perspective view of a game caller and a striker according to an illustrative embodiment of the game call device;

FIG. 2 is a sectional view of the game caller;

FIG. 3 is a perspective view of the game caller held in the hand of a user in exemplary application of the game call device;

FIG. 3A is a microscopic view of a portion of the petrified wood strike plate component of the game caller;

DETAILED DESCRIPTION

Figure 4:
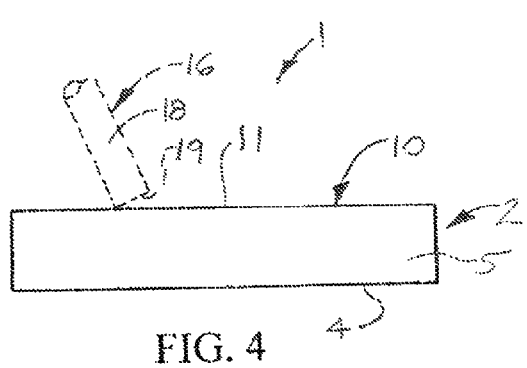
FIG. 4 is a side view of the game caller and a striker (illustrated in phantom) being scraped against the game caller to generate simulated turkey sounds in exemplary application of the game call device.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "upper", "lower", "front", "rear", "side", "interior" and "exterior" as used herein are intended for descriptive purposes only and are not necessarily intended to be construed in a limiting sense.

Referring initially to FIGS. 1-5 of the drawings, an illustrative embodiment of the game call device is generally indicated by reference numeral 1. The game call device 1 includes a game caller 2 having a petrified wood strike plate 10 with a strike plate surface 11. The game call device 1 further includes a striker 16 (FIG. 1). In application of the game call device 1, which will be hereinafter described, the striker 16 is scraped against the strike plate surface 11 of the strike plate 10 to produce sounds which simulate a mating call and/or other sounds made by wild game such as a wild turkey and therefore attract turkeys such as for the purpose of hunting or observation.

As illustrated in FIG. 2, the game caller 2 may include a game caller box 3 having a box bottom 4 and a box side 5 extending from the box bottom 4. In some embodiments, the box side 5 may be generally cylindrical, as illustrated. In other embodiments, the box side 5 may have alternative shapes, as will be hereinafter described. A plate shoulder 6 (FIG. 2) may be shaped in the upper edge of the box side 5. The box bottom 4 and the box side 5 may be wood, plastic, metal and/or any other material which is consistent with the functional requirements of the game caller 2 in application of the game call device 1.

A strike plate 10 is provided on the box side 5 of the game caller box 3. In some embodiments, the strike plate 10 may be seated on the plate shoulder 6 of the box side 5, as illustrated in FIG. 2. The strike plate 10 has an exposed strike plate surface 11. A sound chamber 14 (FIG. 2) is defined by and between the box bottom 4, the box side 5 and the strike plate 10, which extends over the sound chamber 14.

The strike plate 10 of the game caller 2 is petrified wood. Petrified wood is the fossilized remains of terrestrial vegetation in which all organic materials of the original vegetation have been replaced with minerals while retaining the original structure of the vegetation via permineralization. The process of permineralization occurs underground as vegetation is buried under sediment and is initially preserved due to a lack of oxygen which inhibits aerobic decomposition. Water laden with minerals such as quartz, manganese, iron and copper flows through the sediment and deposits the minerals in the cells of the vegetation. As the lignin and cellulose of the plant decay, a stone mould forms in its place. Therefore, petrified wood is a three-dimensional representation of the original organic material in the vegetation. Accordingly, as illustrated in FIG. 3A, structures such as cells 13a and tree rings 13b may remain in the petrified wood of the strike plate 10. These structures, as well as the mineral composition of the strike plate 10, impart to the strike plate surface 11 unique characteristics which render the game caller 2 particularly amenable to application with the striker 16 in substantially effortless generation of authentic turkey sounds by beginner or inexperienced or experienced users in implementation the game call device 1, which will be hereinafter described.

Petrified wood from any location or source can be used to fabricate the strike plate 10 of the game caller 2. In the United States, known petrified wood sites include but are not limited to the Petrified Wood Park (SD), Ginko/Wanapum State Park (WA), Petrified Forest National Park (AZ), Petrified Forest (CA), Mississippi Petrified Forest (MS), Florissant Fossil Beds National Monument (CO), Yellowstone National Park (WY), Theodore Roosevelt National Park (ND), Gilboa Fossil Forest (NY), Escalante Petrified Forest State Park (UT) and Petrified Springs (WI). Other sites of petrified wood can be found in many countries throughout the world.

The game caller 2 may be fabricated by constructing the game caller box 3 using conventional techniques, cutting the strike plate 10 using a conventional tile or masonry saw ("wet saw") or the like commonly used to cut stone or tile workpieces, attaching the strike plate 10 to the plate shoulder 6 and smoothening the strike plate surface 11 of the strike plate 10 using sanding or other smoothening techniques known by those skilled in the art.

The striker 16 may have any structure which is consistent with the functional purpose of generating sounds which simulate the mating and/or other sounds of a wild turkey or other game as the striker 16 is scraped against the strike plate surface 11 of the strike plate 10. In some embodiments, the striker 16 may include a striker handle 17. An elongated striker shaft 18 may extend from the striker handle 17. The striker shaft 18 may be wood such as purple heart, yellow heart, hickory or laminate or may be plastic, metal or other material. The striker shaft 18 has a strike end 19 which is scraped against the strike plate surface 11 to produce the simulated turkey sounds as will be hereinafter further described.

Figure 5:
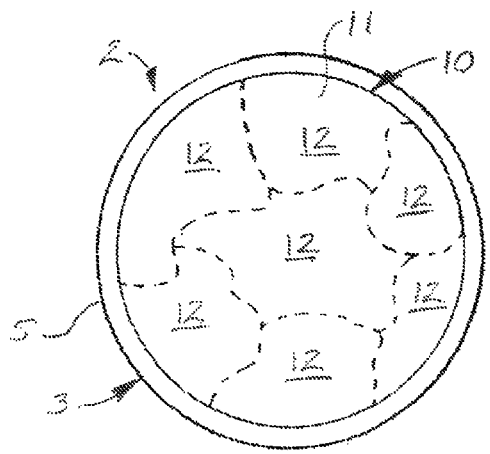
FIG. 5 is a top view of the game caller, more particularly illustrating an exemplary distribution of various strike regions on the strike plate surface of the strike plate for the production of different sounds by scraping of the striker against the various strike regions.
Figure 6:
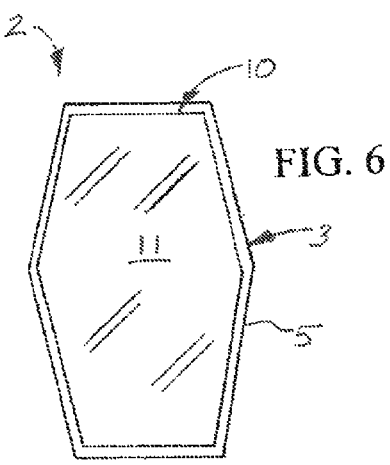
FIG. 6 is a top view of an exemplary elongated hexagonal game caller according to an alternative illustrative embodiment of the game call device.
Figure 7:
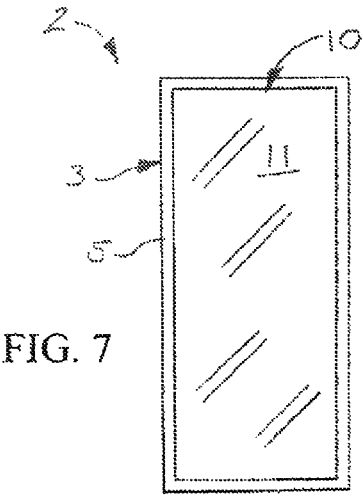
FIG. 7 is a top view of an exemplary elongated rectangular game caller according to an alternative illustrative embodiment of the game call device.
Figure 8:
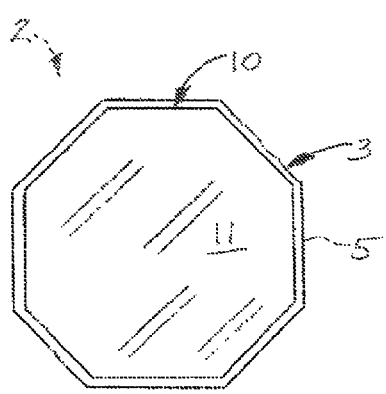
FIG. 8 is a top view of an exemplary octagonal game caller according to an alternative illustrative embodiment of the game call device.

Referring next to FIGS. 3-5 of the drawings, in exemplary application the game call device 1 is used to produce simulated turkey sounds which mimic mating calls and/or other sounds made by wild turkeys to attract turkeys for hunting, observation or other purposes. Accordingly, as illustrated in FIG. 3, the game caller 2 is placed in the palm 23 of a hand 22 (typically the non-dominant hand) of a user. The fingers 24 may be cupped around the box side 5 of the game caller box 3 to stabilize the game caller 2 in the hand 22 of the user. The other hand (not illustrated, typically the dominant hand) of the user grips the striker handle 17 of the striker 16 and serapes the striker end 19 of the striker shaft 18 against the strike plate surface 11 in a back-and-forth or circular motion. These motions of the striker shaft 18 against the strike plate surface 11 create vibrations in the strike plate 10 and the striker end 19 of the striker shaft 18. The vibrations are transmitted through the strike plate 10 into the sound chamber 14, producing the simulated turkey sounds.

As illustrated in FIG. 5, it has been found that scraping the strike shaft 18 of the striker 16 against different areas on the strike plate surface 11 of the strike plate 10 produces a corresponding variety of turkey sounds differing in pitch, tone and quality. These different areas are indicated as multiple exemplary strike regions 12 on the strike plate surface 11 in FIG. 5. The number and arrangement of strike regions 12 on the strike plate surface 11 may vary according to the particular piece of petrified wood which is used to fabricate the strike plate 10.

It has been found that simulated turkey sounds can be readily produced by beginners or persons who are unskilled in the technique of scraping the striker 16 against the strike plate surface 11 of the strike plate 10 without extensive or prolonged practice or instruction. This is in contrast to game call devices having strike plates of conventional materials, which typically require some instruction and practice to master. Moreover, the strike plate surface 11 of the strike plate 10 can be used to produce a variety of different simulated turkey sounds which vary in pitch, tone and quality depending on the strike region 12 (FIG. 5) against which the strike shaft 18 of the striker 16 is scraped. In contrast, game call devices having strike plates of conventional materials typically produce a single turkey simulating sound which is indistinguishable in pitch, tone and quality irrespective of the areas or regions of the strike plate against which the striker is scraped.

Figure 9:
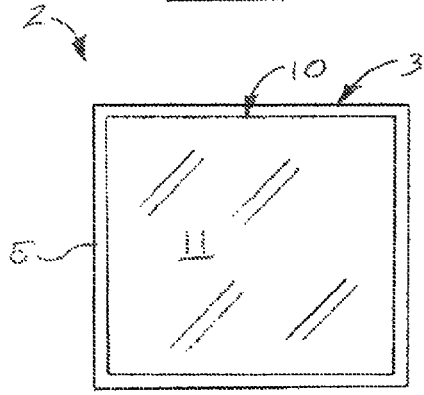
FIG. 9 is a top view of an exemplary square-shaped game caller according to an alternative illustrative embodiment of the game call device.

Referring next to FIGS. 6-9 of the drawings, it will be appreciated by those skilled in the art that the game call device 1 can be fabricated in a variety of different shapes. These shapes include but are not limited to elongated hexagonal (FIG. 6), elongated rectangular (FIG. 7), octagonal (FIG. 8) and square (FIG. 9).

Figure 10:
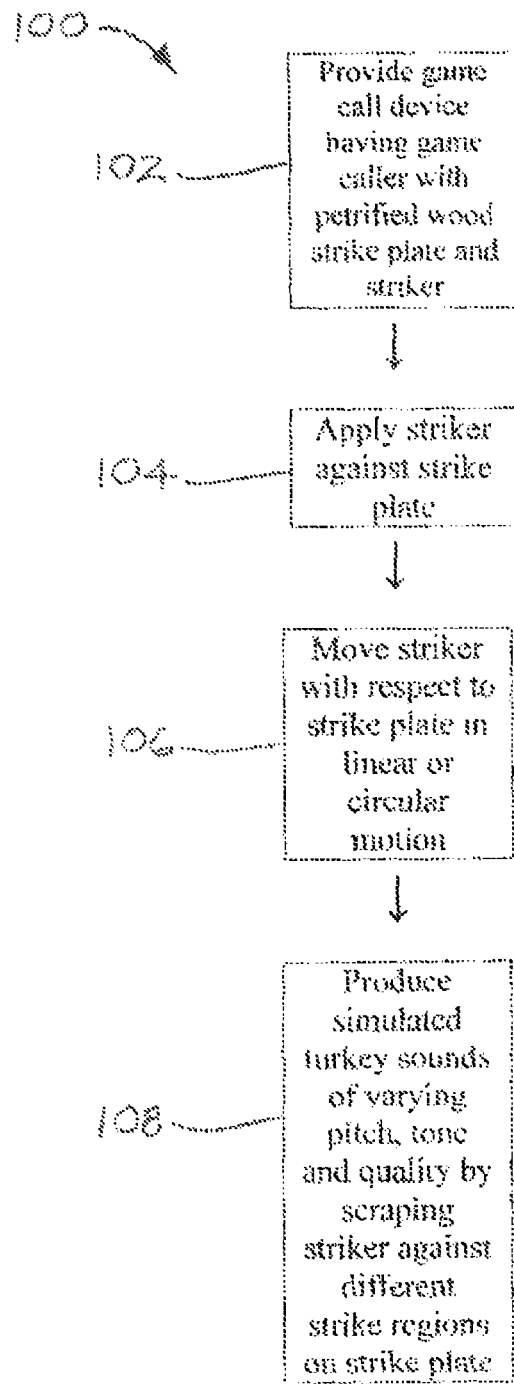
FIG. 10 is a flow diagram of an illustrative embodiment of a game call method.

Referring next to FIG. 10 of the drawings, a flow diagram 100 of an illustrative embodiment of a game call method is illustrated. In block 102, a game call device having a game caller with a petrified wood strike plate and a striker is provided. In block 104, the striker is applied against the strike plate. In block 106, the striker is moved with respect to the strike plate in a linear or circular motion. In block 108, simulated turkey sounds of varying pitch, tone and quality may be produced by scraping the striker against different strike regions on the strike plate.

While illustrative embodiments of the disclosure have been described above, it will be recognized and understood that various modifications can be made and the appended claims are intended to cover all such modifications which may fall within the spirit and scope of the disclosure.

What is claimed is:

1. A game call device, comprising:
   a game caller including:
   a game caller box having a sound chamber;
   a petrified wood strike plate carried by the game caller box; and
   a striker adapted for scraping against the strike plate of the game caller to produce simulated game sounds.

2. The game call device of claim 1 wherein the game caller box comprises a box bottom and a box side extending from the box bottom, and wherein the strike plate is carried by the box side.

3. The game call device of claim 2 wherein the box side is cylindrical.

4. The game call device of claim 2 wherein the box side is elongated hexagonal.

5. The game call device of claim 2 wherein the box side is elongated rectangular.

6. The game call device of claim 2 wherein the box side is octagonal.

7. The game call device of claim 2 wherein the box side is square.

8. A game call device, comprising:
   a game caller including:
   a game caller box having a sound chamber and a plate shoulder;
   a petrified wood strike plate seated on the plate shoulder and extending over the sound chamber and having a strike plate surface; and
   a striker adapted for scraping against the strike plate surface of the game caller to produce simulated game sounds.

9. The game call device of claim 8 wherein the game caller box comprises a box bottom and a box side extending from the box bottom, and wherein the strike plate is carried by the box side.

10. The game call device of claim 9 wherein the box side is cylindrical.

11. The game call device of claim 9 wherein the box side is elongated hexagonal.

12. The game call device of claim 9 wherein the box side is elongated rectangular.

13. The game call device of claim 9 wherein the box side is octagonal.

14. The game call device of claim 9 wherein the box side is square.

* * * * *